United States Patent [19]

Parham, Jr. et al.

[11] 4,219,348
[45] Aug. 26, 1980

[54] STORAGE-STABLE NITROGEN-ZINC FOLIAR SPRAY COMPOSITIONS

[75] Inventors: Thomas M. Parham, Jr.; James E. Sansing, both of Baton Rouge, La.

[73] Assignee: Allied Chemical Corporation, Morris Township, Morris County, N.J.

[21] Appl. No.: 960,401

[22] Filed: Nov. 16, 1978

Related U.S. Application Data

[63] Continuation-in-part of Ser. No. 868,011, Jan. 9, 1978, abandoned.

[51] Int. Cl.$^2$ .............................................. C05C 9/00
[52] U.S. Cl. ......................................... 71/30; 71/59; 71/64 C
[58] Field of Search ...................... 71/30, 59, 64 C, 1, 71/31, 29, 28

[56] References Cited

U.S. PATENT DOCUMENTS

| 3,130,034 | 4/1964 | Young | 71/59 |
| 3,930,832 | 1/1976 | Sansing et al. | 71/30 |
| 4,025,330 | 5/1977 | Storey | 71/30 |
| 4,033,747 | 7/1977 | Young | 71/30 |

Primary Examiner—S. Leon Bashore
Assistant Examiner—Chris Konkol
Attorney, Agent, or Firm—Michael S. Jarosz; Jay P. Friedenson

[57] ABSTRACT

Storage-stable fertilizer compositions comprising aqueous solutions of zinc nitrate, ammonium nitrate and optionally, urea, in minor amounts, are provided.

12 Claims, No Drawings

STORAGE-STABLE NITROGEN-ZINC FOLIAR SPRAY COMPOSITIONS

RELATED APPLICATIONS

This application is a continuation-in-part application of U.S. application Ser. No. 868,011, abandoned, filed Jan. 9, 1978.

BACKGROUND OF THE INVENTION

1. Field of the Invention

This invention is directed to improved compositions containing zinc nitrate and certain plant food nitrogen in aqueous solutions, as a concentrate and as a foliar spray for application on various crops. More particularly, the present invention relates to a storage-stable foliar composition comprised of a synergistic combination of zinc nitrate, ammonium nitrate and up to about 6%, by weight, of urea, in aqueous solution which composition not only exhibits agronomical effectiveness, but also is stable for long term storage under normal ambient conditions.

2. Description of the Prior Art

Zinc deficiency in the soil has been known for years to be a common cause of poor plant growth. It is known from U.S. Pat. No. 3,130,034 that certain zinc deficiencies may be overcome by the incorporation of zinc sulfate in aqueous ammonia to provide solutions having desirable salt out temperatures. This patent points out that the addition of zinc salts to solid fertilizers, such as super phosphate, ammonium nitrate, potassium chloride and the like, is generally not satisfactory since zinc salts render the solid fertilizers hygroscopic, and hence, difficult to store and handle and that the application of zinc in the soil as an aqueous solution is preferable to its application in solid form, because of the ease which liquids can be stored, handled and applied to the soil. For such use, however, it is essential that the aqueous solutions be non-corrosive to permit the use of mild steel equipment and to maintain a high concentration of plant nutrients to permit economical shipment of the fertilizer and to avoid the necessity of repeated applications during the growing season. The concentration of such solutions however, is generally limited by the minimum temperature expected to be encountered in storage or handling of the solution. Unfortunately, aqueous solutions of zinc salts, such as zinc sulfate, are corrosive to mild steel and form relatively large quantities of scale and rust, the most serious problem encountered with zinc salts is their limited solubility, especially in aqueous solutions of ammonium salts to permit their incorporation in these conventional liquid fertilizers.

U.S. Pat. No. 3,620,708 recognizes that while it is possible to obtain practical amounts of zinc oxide in solution in certain high analysis liquid fertilizers, it has been found that such solutions are unstable or incompatible, with formation of precipitates, when diluted or blended with other liquid fertilizer ingredients.

U.S. Pat. No. 3,640,698 is concerned with fertilizer compositions comprising fertilizer solutions of water, urea and ferrous sulfate, zinc sulfate or manganese sulfate, which compositions are suitable for correction of nutrient deficiencies in crops and soils; according to this patent, at certain critical pH range, the aforementioned sulfate salts form novel eutectic compositions with the aqueous urea solutions, thereby resulting in nutrient fertilizer solutions.

U.S. Pat. Nos. 3,930,832 and 4,025,330 disclose the use of zinc nitrate in specific aqueous nitrogen solutions as foliar spray compositions, and specifically, the use of a solution of a zinc nitrate, ammonium nitrate and high concentrations of urea, as foliar spray fertilizer compositions. U.S. Pat. No. 4,025,330 further discloses the obtainment of significantly improved agronomical results with the aforesaid compositions as compared with foliar spray compositions of zinc sulfate, ammonium nitrate and urea, and U.S. Pat. No. 3,930,832 discloses an improved composition as compared with that of U.S. Pat. No. 4,025,330, in requiring the incorporation of an effective amount of a thiosulfate compound as a corrosion inhibitor to carbon steel. However, as is evident from the disclosures of both U.S. Pat. No. 3,930,832 and U.S. Pat. No. 4,025,330, the urea and ammonium nitrate are incorporated in the foliar spray compositions as a fertilizer solution because of the availability of such solutions as commercial fertilizers, and hence, these fertilizer compositions contain on a weight basis, at least about 14% of urea and generally, at least about 20%, by weight, of urea.

SUMMARY OF THE INVENTION

The present invention provides certain novel zinc nitrate-containing concentrate and foliar spray fertilizer compositions which are stable upon long term storage and additionally exhibit low salt out temperatures. The compositions of the present invention comprise a solution consisting essentially of about 8% to 20%, preferably between about 12% and 18%, by weight, of zinc nitrate, about 18% to 36%, preferably between about 25% and 35%, by weight, of ammonium nitrate, and urea in an amount from 0 up to about 6%, preferably up to about 4%, by weight of the composition, the balance being water, and are characterized by having an ammonium nitrate to urea weight ratio of at least about 3 to 1, preferably between about 5 to 1 and 15 to 1, and a nitrogen to zinc weight ratio of between about 1 to 1 and 8 to 1, preferably between about 2 to 1 and 6 to 1. Although the compositions described in the aforementioned U.S. Pat. No. 3,930,832 and U.S. Pat. No. 4,025,330 exhibit desirable agronomic properties, such compositions suffer a major drawback in their instability upon long term storage, for example, four months or greater, under conditions to which such compositions are often subjected in commercial practice. Such instability, it was found in accordance with the present invention, is manifested by the formation of zinc-containing precipitates which are believed to be caused by the presence of urea present in substantially higher concentrations as compared with the compositions of the present invention which are urea-free or may contain only minor quantities of urea. Such precipitates remove zinc from the fertilizer solution thereby rendering the same unavailable for foliar absorption. Moreover, such unstable compositions containing the resultant zinc precipitates cannot be conveniently handled as a concentrate or applied as foliar spray in conventional equipment, and hence, are unacceptable in contemplated commercial use. Furthermore, elevated storage temperatures, for example, above about 85° F. or higher, which temperatures are not at all uncommon in storage warehouses, especially during the summer growing season months, markedly accelerate the formation of such precipitates. As indicated in Table 1, below, a typical composition of the aforesaid U.S. Pat. No. 4,025,330 tends to precipitate as much as 25% of the zinc present therein upon storage at 100° F. for a period of about three months.

The compositions of the present invention are obtained in conventional manner by simple admixture of zinc nitrate in aqueous solution with ammonium nitrate and urea, if employed; the ammonium nitrate and urea components may be incorporated in solid or liquid form. The resultant liquid compositions, formed by admixture of the ammonium nitrate, urea, if employed, and aqueous zinc nitrate solution, in general, exhibit a pH ranging from about 3 to about 7. The storage-stable compositions of the present invention are further characterized by a pH of up to about 5, generally between about 3.5 and 5, and preferably between about 3.7 and 4.5, since a pH greater than about 5 results in the precipitation of zinc. Accordingly, in the event the pH of the resultant admixture of the aqueous zinc nitrate, ammonium nitrate and urea, if present, is below about 3, sufficient ammonia may be added in conventional manner (for example, in the form of ammonium hydroxide solution containing about 30% ammonia) to the solution to adjust the pH to the desired range, and in the event the resultant admixture exhibits a pH above the aforementioned range, the pH may be lowered in conventional manner by the incorporation of sufficient quantities of a mineral acid, such as nitric acid, sulfuric acid or hydrochloric acid, to adjust the pH to the desired range.

Since liquid compositions containing zinc salts or oxides and/or liquid nitrogen fertilizers are known to be corrosive to carbon steel equipment used in the transportation and application of concentrates and foliar spray compositions, a corrosion inhibitor is advantageously incorporated in the compositions of the present invention in an effective amount to inhibit such corrosion. In general, the incorporation of a water-soluble thiosulfate compound, such as ammonium thiosulfate, sodium thiosulfate or potassium thiosulfate in an amount between about 0.1% and 5%, preferably between about 0.1 and 0.5% by weight of the composition, satisfactorily provides protection for carbon steel without deleterious effect on the stability of the compositions of this invention. The pH of the resultant compositions of the invention is maintained generally between about 3.5 and 5 when a water soluble thiosulfate compound is incorporated therein.

The compositions of the present invention are produced as a concentrate, and hence, are readily adapted for handling, transport and storage, as such; although such concentrates are employable directly as fertilizers suitable for soil application as well as foliar spray fertilizers, these concentrates normally are further diluted with additional quantities of water, generally, up to about 1,000 parts, and preferably 80 to 200 parts, by weight, per part of the composition for most applications as a foliar spray. Hence, the storage-stable compositions of the present invention contain as essential ingredients, water, zinc nitrate solute, ammonium nitrate solute, and minor amounts of urea, if employed, and desirably a corrosion inhibitor, such as a thiosulfate compound, in the concentrations above specified. The compositions of the present invention may additionally contain minor amounts, illustratively up to about 100 parts per million, of a dye to provide for distinctive color identification, as well as other adjuvants conventionally employed in the preparation and application of liquid fertilizer compositions provided these adjuvants, either as a result of concentration employed or by their nature, are not deleterious to the fertilizer compositions of the invention. The compositions of the present invention are further characterized by being substantially free of zinc-containing precipitates, and hence, are storage stable over a period of at least four months at ambient temperatures, i.e. about 85° F., and further exhibit salt out temperatures below about 32° F., preferably below about 28° F.

The compositions of the invention may be employed in foliar application, be applied through irrigation water or incorporated in liquid starter fertilizers and applied as such directly to the soil. In foliar application, the compositions are generally employed in proportions ranging from about one gallon of the aforesaid concentrate to from about three to about one thousand gallons of water, depending upon the crop to which the fertilizer composition is applied; a typical composition of the invention, present as a 15-0-0-5Zn solution, is applied, in general, in an amount of between about 0.1 to 1 gallon of concentrate per one hundred gallons of water when applied to fruit trees such as cherry, peach, apple, pear, and citrus, as well as to nut trees including almond, walnut, and pecan. Similar concentrations and higher, up to about five gallons of concentrate per 100 gallons of water may be applied to row crops and field crops including beans, tomatoes, sugar beets, rice, peppers, brussel sprouts, lettuce, safflower, and potatoes. When applied through irrigation water or as a soil fertilizer, the compositions are employable in conventional manner in amounts from about 0.05 gallon to 10 gallons of the concentrate in a suitable quantity of water per acre. The actual volume of composition employed in any application can be varied depending upon the density of the foliage and amount of zinc desired to be incorporated into the zinc-deficient plants and/or soil. The fertilizer compositions of the invention may, if desired, be applied annually, although more frequent application, such as semi-annually, or quarterly, may be used, or alternatively, these applications can be less frequent, for example, bi-annually.

The compositions of the present invention may likewise have incorporated therein minor amounts, for example, from about 0.1 to 2 wt % of a surfactant not deleterious to the compositions, which aids in the spreading of the solutions on the foliage to achieve an even coverage and also assists in absorption of the fertilizer into the foliage; examples of suitable surfactants are cationic, anionic, and non-ionic types as well as mixtures thereof which are well known in the art. In addition, various pesticides can be incorporated in the compositions of the invention to obtain combined fertilization-pesticidal treatment; the pesticides so incorporated include herbicides having selective action for undesired vegetation, or insecticides, larvicides miticides, and the like, all of which are well known to those skilled in the art and employable in accordance with conventional practice.

In order to demonstrate the invention, the following examples are provided.

EXAMPLE 1

This Example illustrates the preparation by a preferred procedure of a typical composition of the invention.

In one embodiment of this invention, a storage-stable preferred 15-0-0-5Zn fertilizer grade composition, containing about 15 weight percent total plant food nitrogen and 5 weight percent zinc, is obtained by admixing a zinc nitrate solution containing about 16.5 weight percent zinc with a second solution containing about 18.5 weight percent total nitrogen derived from ammonium nitrate and urea. The second solution contains urea and ammonium nitrate in an amount such that the resultant 15-0-0-5Zn fertilizer solution prepared therefrom will contain about 3 weight percent urea, and the weight ratio of ammonium nitrate to urea will be about 10.9 to 1 and also typically contains ammonium thiosulfate in an amount such that the 15-0-0-5Zn fertilizer grade solution prepared therefrom will contain about 0.15 weight percent ammonium thiosulfate to act as a metal corrosion inhibitor.

For use in preparing the aforementioned 15-0-0-5Zn solution, zinc nitrate solution containing about 16.5% zinc may be obtained commercially or prepared by reaction of metallic zinc or zinc oxide with nitric acid and introducing sufficient water to the reaction mixture to provide a zinc nitrate product solution containing about 16.5% zinc (47.8% zinc nitrate). This is accomplished by adding commercially available granular zinc oxide (containing about 80% zinc ) to a mixture of water and commercial strength (about 55%) nitric acid solution in a vessel provided with agitation and means for temperature control, e.g., coil(s) for steam heating and water cooling, together with a temperature sensing device. Typically, a 10 part batch of said zinc nitrate solution is prepared by adding to the reaction vessel about 5.8 parts of 55% nitric acid and 2.1 parts of water. After thorough mixing, granular zinc oxide is added over a period of about 15 to 30 minutes, accompanied by vigorous agitation. Once vigorous reaction has begun and during the period that it is self-sustaining, cooling is employed to maintain a reaction mix temperature of around 140° to 180° F. The rate of addition of zinc oxide granules is governed by the ability to maintain such temperature. The total reaction, generally requiring around 30–45 minutes, is usually deemed complete when substantially no particles of unreacted zinc oxide remain in the reaction mixture and the pH of said mixture has risen from about 0 to about 2 to 3.

Further, in preparation of the aforementioned 15-0-0-5Zn solution, the cited solution containing about 18.5% total nitrogen is obtained by admixing commercial grade solutions of 60% ammonium nitrate, 50% urea, 60% ammonium thiosulfate and water in sufficient quantities to achieve the desired dilution. About 25 parts of said 18.5% total nitrogen solution containing ammonium nitrate, urea and ammonium thiosulfate in the preferred ratio for the final 15-0-0-5Zn solution is conveniently prepared by pumping into a vessel, equipped with means for agitation, about 19.6 parts of 60% ammonium nitrate solution, 2.1 parts of 50% urea solution, 0.1 parts of 60% ammonium thiosulfate solution and 3.2 parts of water, the total being thoroughly mixed by agitation of the contents of the vessel.

About 25 parts of the preferred 15-0-0-5Zn composition may be prepared by admixing, in a vessel with agitation, about 7.6 parts of the aforementioned zinc nitrate solution containing 16.5% zinc and about 17.4 parts of the aforementioned solution containing 18.5% total nitrogen from ammonium nitrate and urea. The pH of the final product is desirably about 4. If adjustment is necessary in some cases to obtain a pH of about 4, small amounts, as required, of ammonium hydroxide solution (about 30% ammonia) may be added if elevation of the pH is needed, or about 55% nitric acid may be added if lowering of this pH is required. If desired, up to about 100 ppm of a water-soluble organic dye is also typically added to the total composition, with agitation, to impart a characteristic color; alternatively, such dye may be added, with allowances for final dilution, to the 18.5% total nitrogen solution.

EXAMPLE 2

Storage tests of zinc nitrate-ammonium nitrate solutions at 100° F. are set forth in the following Table 1. The results of these tests show the storage stability of compositions of the present invention as compared with a typical composition disclosed in the aforementioned U.S. Pat. No. 4,025,330.

TABLE 1

STORAGE TESTS OF FERTILIZER SOLUTIONS[1] AT 100° F.

Weight Percent Urea

| Days Stored | 0% | | 1.4% | | 4.1% | | 6.8% | | 21.5%[3] | |
|---|---|---|---|---|---|---|---|---|---|---|
| | pH | %Zn | pH | %Zn | pH | %Zn | pH | %Zn | pH | %Zn |
| 0 | 4.0 | 5.5 | 4.0 | 5.5 | 4.0 | 5.5 | 4.0 | 5.5 | 4.2 | 5.5 |
| 30 | 4.0 | — | 4.1 | — | 4.45 | — | 4.7 | —[2] | 4.7 | —[2] |
| 115 | 3.9 | 5.5 | 4.3 | 5.5 | 4.8 | 5.5 | 4.4 | 5.0[2] | — | 4.1[2] |

[1] Fertilizer compositions containing on a weight basis, 14.5%, of zinc nitrate, 28.9% of ammonium nitrate, and the indicated amount of urea, balance being water. The pH of the solution and percent of elemental zinc is set forth in the Table.
[2] Zinc containing precipitate formed.
[3] Commercially available foliar spray composition, characterized as 22-0-0-5.5Zn, having the following composition on a weight basis: 15.9% of zinc nitrate, 27.7% of ammonium nitrate, 21.4% of urea and 35% of water.

It is apparent from the results set forth above that fertilizer solutions containing up to about 4% urea are completely stable and are free of formation of any zinc-containing precipitates which remove zinc from the fertilizer solutions. In contrast, compositions containing as little as 6.8% urea and 21.5% urea (the latter being exemplary of compositions disclosed in aforementioned U.S. Pat. No. 4,025,330) are deficient in stability since such compositions precipitate zinc in as little as 30 days following preparation of the fertilizer composition.

EXAMPLE 3

Following Table II shows the tissue analysis of potato leaves foliarly treated at the various rates indicated with a commercially available zinc-nitrate containing fertilizer, as well as with a typical fertilizer composition of the present invention. The test results reported were made fifteen (15) days following foliage applications.

TABLE II

| Zinc-containing Composition | Rate (Qts./Acre)Mean | Mean Zinc Content of Leaf (PPM) |
|---|---|---|
| Composition 1[1] | 1 | 165 |
| Composition 1[1] | 2 | 170 |
| Composition 1[1] | 4 | 490 |
| Composition 1[1] | 8 | 615 |
| Composition 2[2] | 1 | 108 |
| Composition 2[2] | 2 | 215 |
| Composition 2[2] | 4 | 358 |
| Composition 2[2] | 8 | 805 |
| Control | — | 34 |
| | | Least Significant Difference (at 5%) 118 |

[1] A 22-0-0-5.5Zn Solution consisting essentially of 15.9% zinc nitrate, 27.7% ammonium nitrate, 21.4% urea, and 35% of water.
[2] A 15-0-0-5Zn Solution of the present invention consisting essentially of 14.5% zinc nitrate, 28.9% ammonium nitrate, 3.0% urea, 53.4% water and 0.2% of ammonium thiosulfate.

The results set forth in Table II above demonstrate that the compositions of the present invention are at least as effective as commercially available zinc nitrate containing fertilizer compositions.

We claim:

1. A composition comprising a storage-stable fertilizer solution of pH below about 5 consisting essentially of water, about 8% to 20%, by weight, of zinc nitrate solute, about 18% to 36%, by weight, of ammonium nitrate solute and urea solute in an amount from 0 up to about 6%, by weight, of the composition, said fertilizer solution having an ammonium nitrate to urea weight ratio of at least about 3 to 1 and a nitrogen to zinc weight ration of between about 1 to 1 and 8 to 1.

2. The composition of claim 1 additionally containing up to about 1,000 parts, by weight, of water, per part of the composition, said composition being capable of being applied as a foliar spray fertilizer.

3. The composition of claim 1, further characterized by having a salt-out temperature below about 32° F.

4. The composition of claim 1 having a pH of between about 3.5 and 5 additionally containing a water-soluble thiosulfate compound in an amount sufficient to inhibit corrosion to carbon steel.

5. The composition of claim 1 wherein the zinc nitrate is present in an amount between about 12% and 18%, by weight, the ammonium nitrate is present in an amount between about 25% and 35%, by weight, the urea is present in an amount from 0 up tp about 4%, by weight of the composition, and the pH of the fertilizer solution is between about 3.7 and 4.5, said fertilizer solution having an ammonium nitrate to urea weight ration of between 5 to 1 and 15 to 1 and a nitrogen to zinc weight ratio of between about 2 to 1 and 6 to 1.

6. The composition of claim 5 additionally containing up to about 200 parts, by weight, of water, per part of the composition, said composition being capable of being applied as a foliar spray fertilizer.

7. The composition of claim 5, further characterized by having a salt-out temperature below about 28° F.

8. The composition of claim 5, additionally containing a water soluble thiosulfate compound selected from the group consisting of ammonium thiosulfate, sodium thiosulfate and potassium thiosulfate in an amount sufficient to inhibit corrosion to carbon steel.

9. The composition of claim 1 wherein the zinc nitrate is present in an amount between about 14% and 16%, by weight, the ammonium nitrate is present in an amount between about 28% and 32%, by weight, and the urea is present in an amount up to about 3%, by weight, of the composition, and the pH of the fertilizer solution is between about 3.7 and 4.5, said composition being substantially free of zinc-containing precipitates after storage at temperatures of at least about 85° F. for a period of four months.

10. The composition of claim 9 additionally containing a water-soluble thiosulfate compound selected from the group consisting of ammonium thiosulfate, sodium thiosulfate and potassium thiosulfate present in an amount between about 0.1 and 0.5%, by weight, of the composition.

11. The composition of claim 10 additionally containing between about 80 and 200 parts, by weight, of water, per part of the composition, said composition being capable of being applied as a foliar spray fertilizer.

12. The composition of claim 10 further characterized by having a salt-out temperature below about 28° F.

* * * * *